US009016912B1

(12) United States Patent
Gustafson

(10) Patent No.: US 9,016,912 B1
(45) Date of Patent: Apr. 28, 2015

(54) LIGHTED MUD FLAPS FOR CARS, TRUCKS AND OFF-ROAD VEHICLES

(71) Applicant: Kim Gustafson, Fairbanks, AK (US)

(72) Inventor: Kim Gustafson, Fairbanks, AK (US)

(*) Notice: Subject to any disclaimer, the term of this patent is extended or adjusted under 35 U.S.C. 154(b) by 28 days.

(21) Appl. No.: 14/105,806

(22) Filed: Dec. 13, 2013

Related U.S. Application Data

(60) Provisional application No. 61/960,263, filed on Sep. 13, 2013.

(51) Int. Cl.
*B60Q 1/26* (2006.01)
*B62D 25/18* (2006.01)
*B60Q 1/00* (2006.01)
*B60Q 1/32* (2006.01)

(52) U.S. Cl.
CPC .............. *B60Q 1/0088* (2013.01); *B60Q 1/326* (2013.01); *B62D 25/18* (2013.01)

(58) Field of Classification Search
CPC .... B62D 25/18; B62D 25/188; B62D 25/161; B60Q 1/326
USPC ........................... 362/485, 500, 505; 280/847
See application file for complete search history.

(56) References Cited

U.S. PATENT DOCUMENTS

| 4,924,209 | A | * | 5/1990 | Kao ............................... 340/479 |
| 5,025,351 | A | * | 6/1991 | Martin .......................... 362/506 |
| 6,938,930 | B1 | * | 9/2005 | Beach ............................ 280/851 |
| 8,721,139 | B2 | * | 5/2014 | Wilkerson ..................... 362/485 |
| 2003/0184078 | A1 | * | 10/2003 | Grable ........................... 280/847 |

FOREIGN PATENT DOCUMENTS

GB            2358913        *  8/2001   ............. B62D 25/18

* cited by examiner

*Primary Examiner* — Peggy Neils
(74) *Attorney, Agent, or Firm* — Michael J. Tavella

(57) ABSTRACT

A mud flap that is fitted with a number of LED lights that illuminate the mud flap and any designs that may be on the flap. The lights also provide a safety feature, as the illuminated mud flaps help make a vehicle easier to see in dark driving conditions. Moreover, it is possible to connect the mud flap circuits into the brake light system to illuminate a set of red lights when braking to improve visibility. The mud flap is built up using a front rubber piece, a back rubber piece and a clear plastic insert that provides spacing for the LED bulbs. The back rubber piece is thicker at the top to maintain the proper spacing and shape. The mud flap is held together by rivets or glue, depending on the material used.

18 Claims, 7 Drawing Sheets

LIGHTED MUD FLAPS FOR CARS, TRUCKS AND OFF-ROAD VEHICLES

CROSS REFERENCE TO RELATED APPLICATIONS

This application claims benefit of Provisional application 61/960,263 filed Sep. 13, 2013.

STATEMENT REGARDING FEDERALLY SPONSORED RESEARCH AND DEVELOPMENT

Not Applicable

BACKGROUND OF THE INVENTION

1. Field of the Invention

This invention relates to lighted mud flaps and particularly to lighted mud flaps using light-emitting diodes (LED) lights.

2. Description of the Prior Art

Mud flaps are devices attached to cars, most trucks and off-road vehicles. These flaps help contain road spray and mud from being projected rearwards from a vehicle. Although this is their main function, mud flaps are highly visible and can be used to display advertising, logos, or designs. Typically, these are applied or printed on the mud flaps. Obviously, these printed designs are best seen during the day. At night, it is often too dark to see them clearly.

BRIEF DESCRIPTION OF THE INVENTION

The instant invention overcomes this difficulty. It is a mud flap that is fitted with a number of light-emitting diodes (LED) lights that illuminate the mud flap and any designs that may be on the flap. The lights also provide a safety feature, as the illuminated mud flaps help make a vehicle easier to see in dark driving conditions. Moreover, it is possible to connect the mud flap circuits into the brake light system to illuminate a set of red lights when braking to improve visibility. The mud flap is built up using a front rubber piece, a back rubber piece and a clear plastic insert that provides spacing for the LED bulbs. The back rubber piece is thicker at the top to maintain the proper spacing and shape. The mud flap is held together by rivets or glue, depending on the material used.

DETAILED DESCRIPTION OF THE INVENTION

Figure 1:
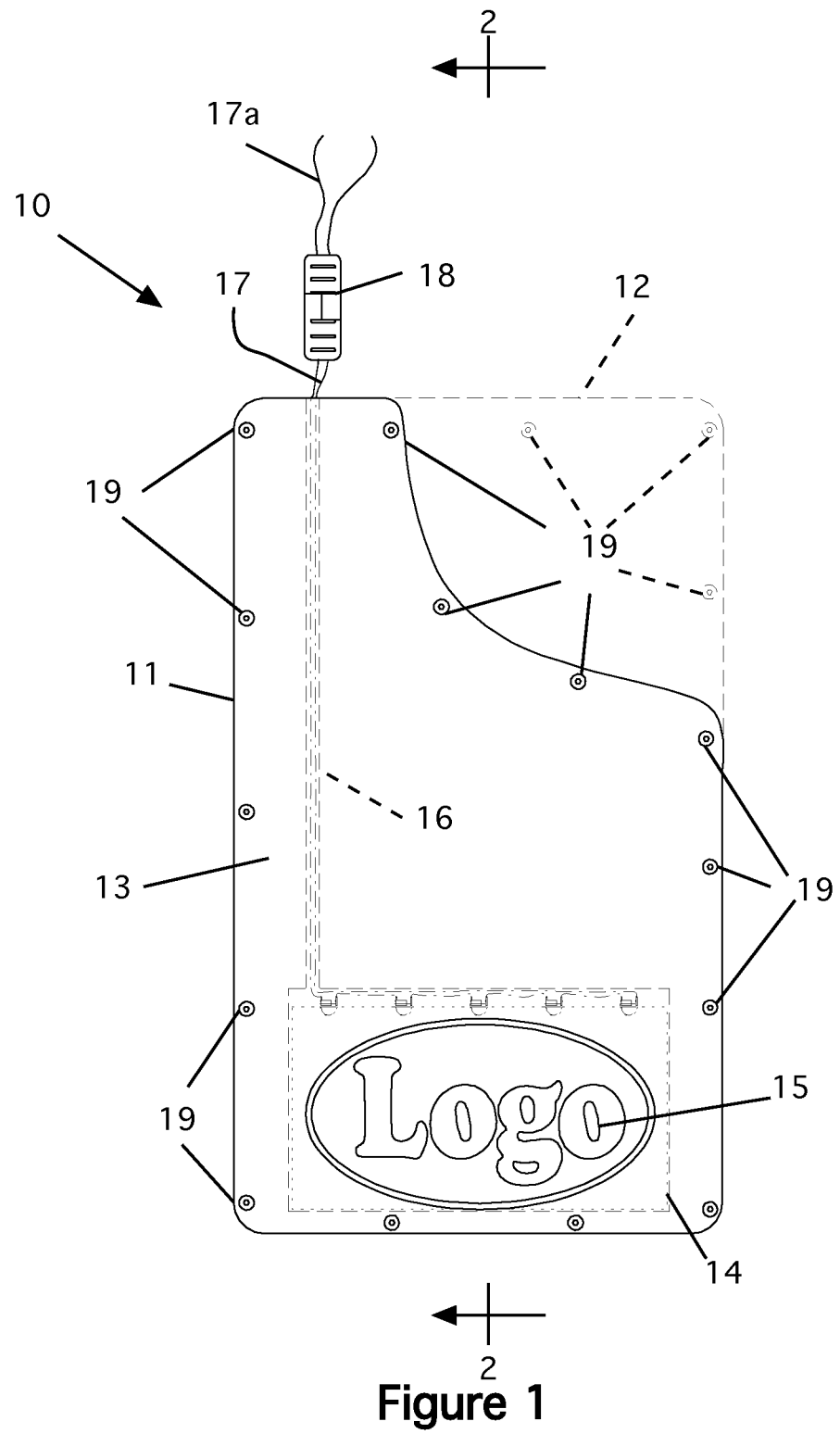
FIG. 1 is a front view of the invention.

Referring now to the drawing figures, FIG. 1 is a front view of the invention 10. The invention 10 is a mud flap. The flap 10 can have a different shape, as desired. For example, the figure shows a solid line 11 that forms a flap with a contoured top. However, the flap 10 can have a rectangular shape as shown by the dashed line 12. As such, the shape can be any desired shape, as long as it has the ability to be attached to the vehicle and, preferable, be able to work as a mud flap in deflecting road spray.

Figure 2:
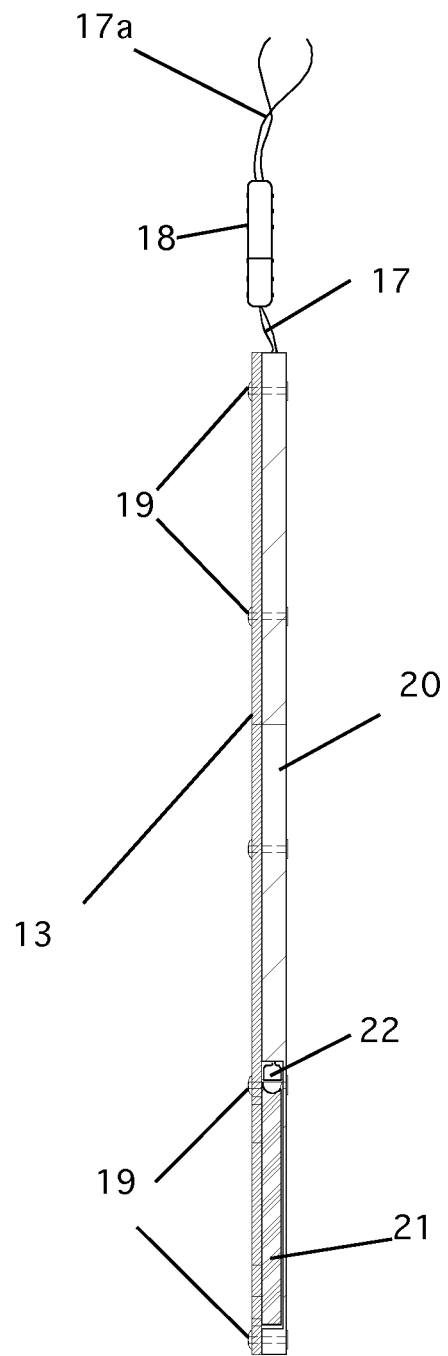
FIG. 2 is a cross-sectional view taken along the lines 2-2 of FIG. 1.

FIG. 1 shows the front of the flap, which is a piece of rubber or metal 13. As shown in FIG. 2, this front piece is relatively thin. At the bottom, there is a cutout 14 for a design or logo 15, as shown. The cutout 14 can be of any shape. For example, the actual design can be cut into the front piece, or, the cutout can be a simple rectangle into which a sticker for the logo 15 can be placed. Note that FIG. 1 shows a channel 16 cut into the back piece (see below) to hold the wires 17 (see FIG. 3). Note that in the preferred embodiment, the wires 17 exit the top of the mud flap 10 and are attached to a waterproof connector 18. Wires 17a then go to the power source (see FIGS. 5a, b, c).

Finally, note the rivets 19 that are used to attach the front piece to the back piece when the front piece is metal. Where the front and back pieces are rubber, an adhesive such as glue is used instead of rivets.

Figure 3:
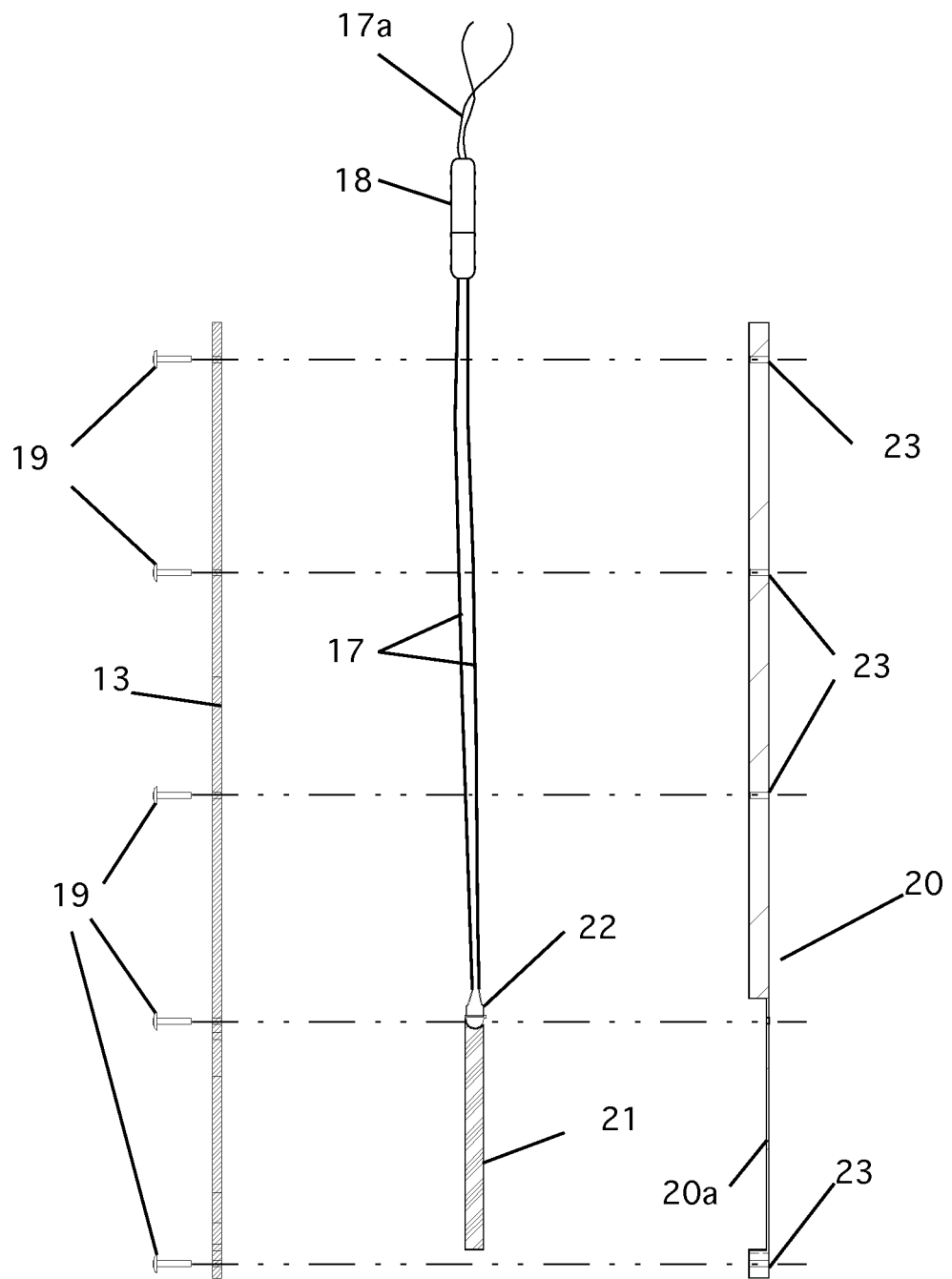
FIG. 3 is an exploded view of section shown in FIG. 2.

FIG. 2 is a cross-sectional view taken along the lines 2-2 of FIG. 1. Here, the mud flap 10 is shown. The front piece 13 is shown with rivets 19 (as noted above, rivets are only used with a metal front piece. A rubber back piece 20 is attached to the front piece. Note that, as shown in FIG. 3, the back piece has a cutout 20a to accommodate the plastic insert 21. In the preferred embodiment, the plastic insert is a piece of frosted acrylic glass such as Plexiglas. Note the wires 17 and the connector 18.

FIG. 3 is an exploded view of section shown in FIG. 2. Here, the individual components are shown. The front piece 13 is shown with the rivets 19 (again, rivets are used with a metal front piece; see FIG. 3a for a rubber front piece.) In the center are the wires 17 that are attached to one or more LED lights 22. In the preferred embodiment, the LEDs are Superflux 4 chip type and can vary in color and are commercially available. Below the LEDs is the plastic insert 21. At the back, is the back piece 20. In the preferred embodiment, this piece is rubber Note that the bottom is cutout at 20a to accommodate the plastic insert 21. Note too holes 23 that are drilled for the rivets. Note too the wires 17 attaching to the connector 18 and the wires 17a that go to the power source.

Figure 3A:
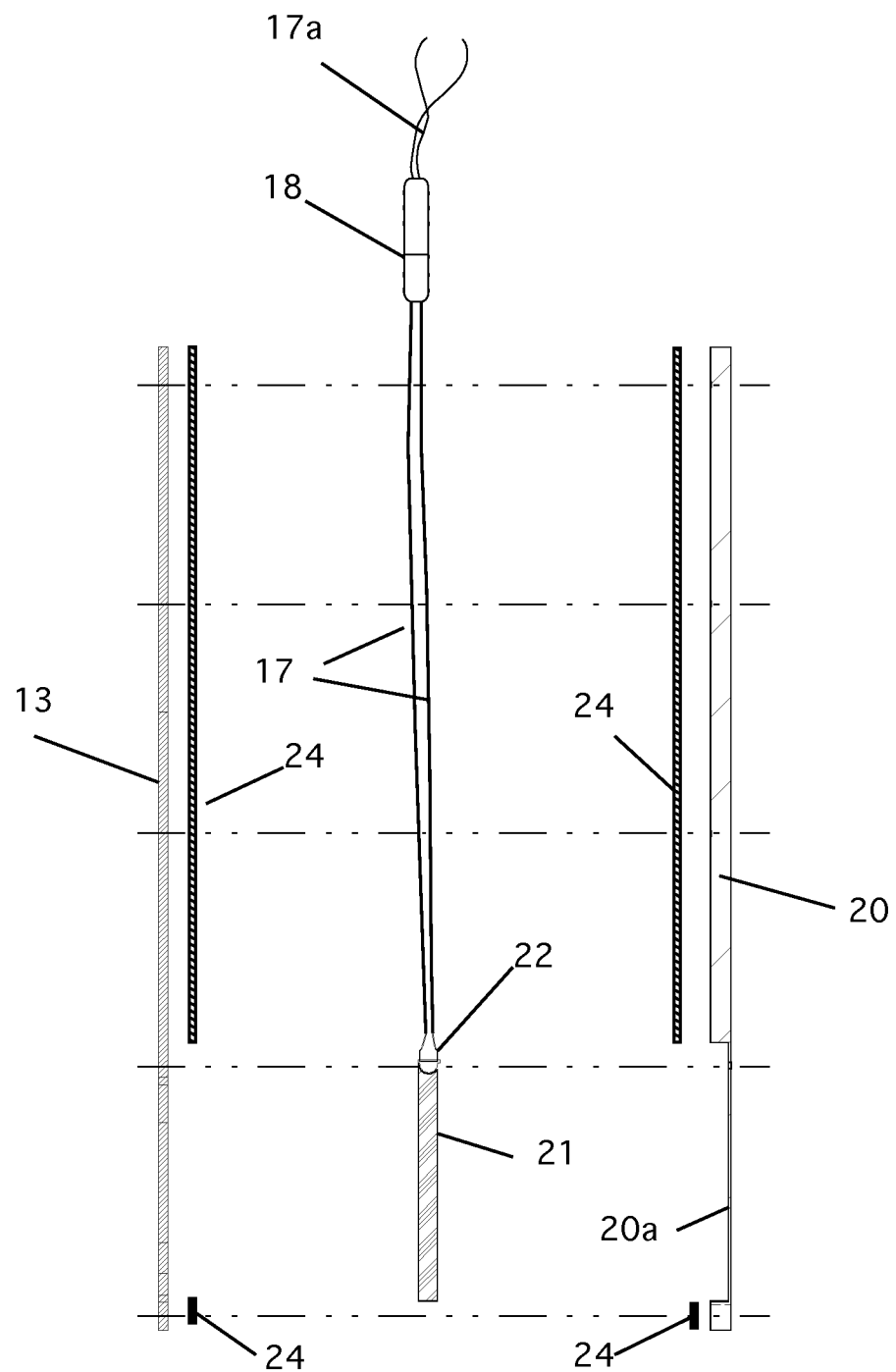
FIG. 3a is an exploded view of the invention using glue instead of rivets.

FIG. 3a is an exploded view of the invention using glue instead of rivets. Here, front piece 13 is shown without the rivets. As before, in the center are the wires 17 that are attached to one or more LED lights 22. In the preferred embodiment, the LEDs are Superflux 4 chip type and can vary in color and are commercially available. Below the LEDs is the plastic insert 21. At the back, is the back piece 20. In the preferred embodiment, this piece is rubber Note that the bottom is cutout at 20a to accommodate the plastic insert 21. Note too holes 23 that are drilled for the rivets. Note too the wires 17 attaching to the connector 18 and the wires 17a that go to the power source.

The difference here is that there is a layer of adhesive 24 that applied to both the front piece and the back piece such that when they are brought together, the pieces adhere.

Figure 4:
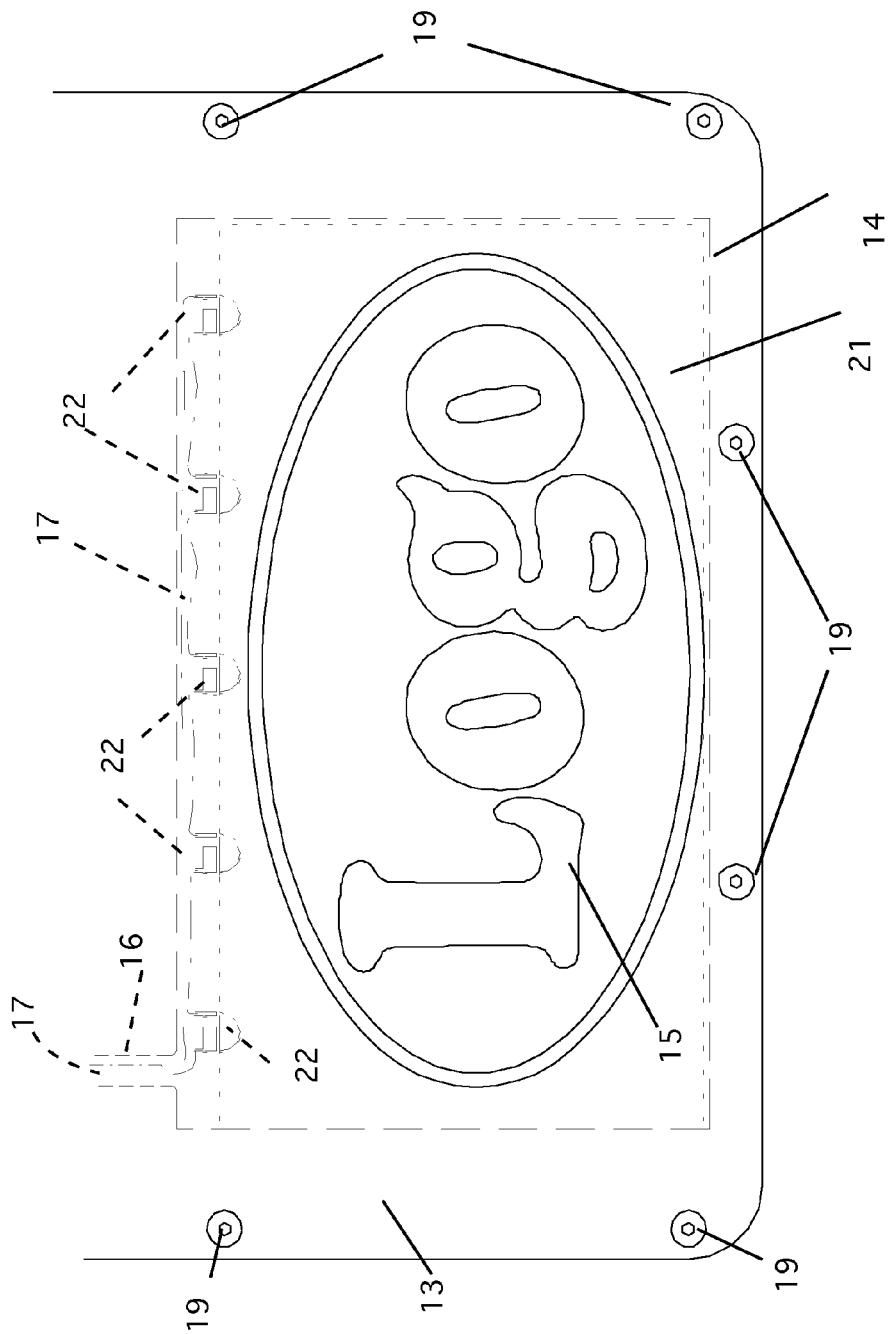
FIG. 4 is an enlarged view of the lower section of the front view of the invention shown in FIG. 1.

FIG. 4 is an enlarged view of the lower section of the front view of the invention shown in FIG. 1. In this view, the lower portion of the invention is enlarged for clarity. Note the front piece 13 and the rivets 19, as discussed above. Note too the cutout 14, the logo 15, and the plastic insert 21. At the top of the cutout, the LEDs 22 are shown. In this figure, five LEDs are used, however, that number can vary. The channel 16 is shown as well as the wires 17. Note here, the bulbs are wired in series. Of course, with different LEDs, other circuit configurations are possible. Such configurations are well known in the art.

Figure 5A:
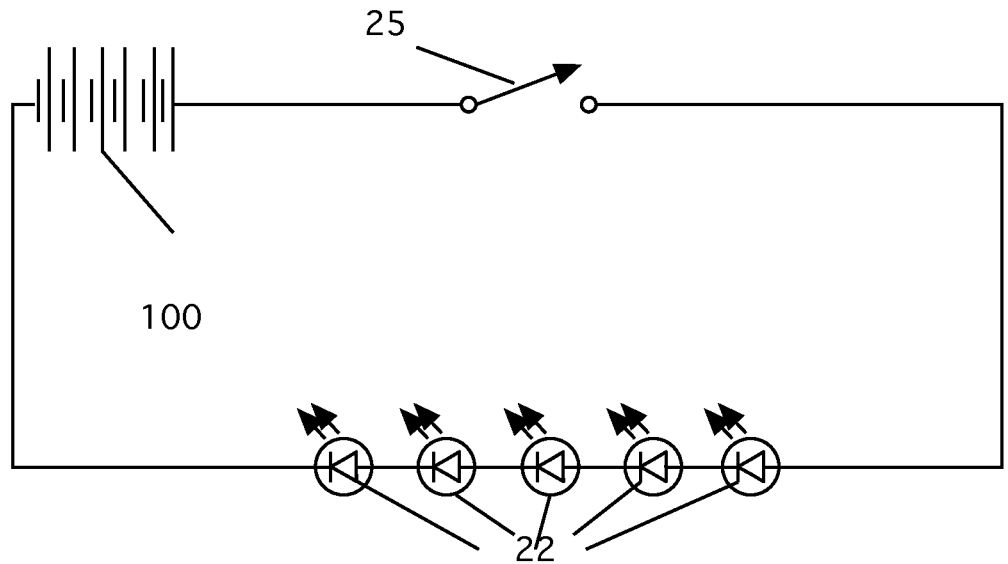
FIG. 5a is a schematic diagram showing the power circuits for the invention connected to a separate operating switch.
Figure 5B:
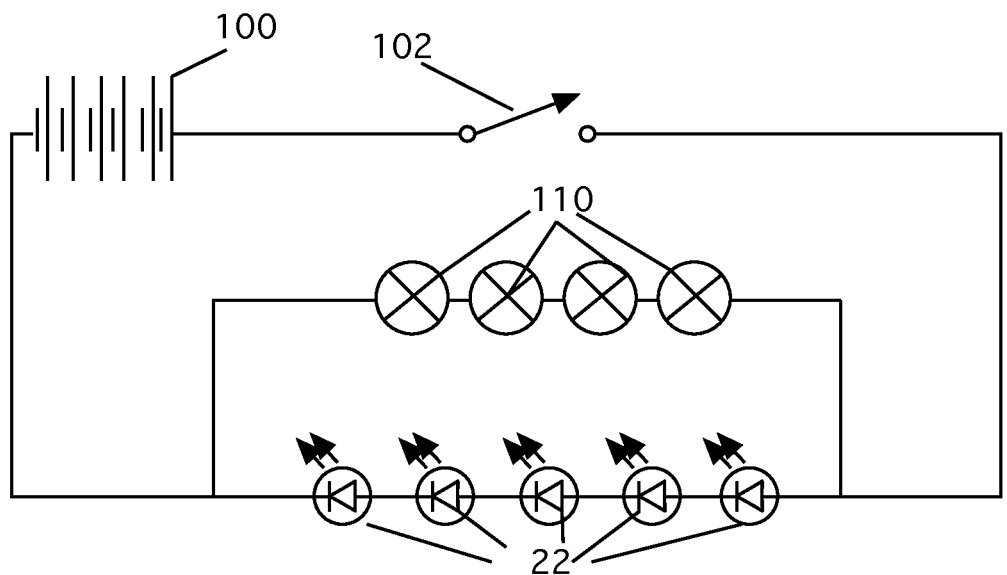
FIG. 5b is a schematic diagram showing the power circuits for the invention connected to the main light switch for the vehicle.
Figure 5C:
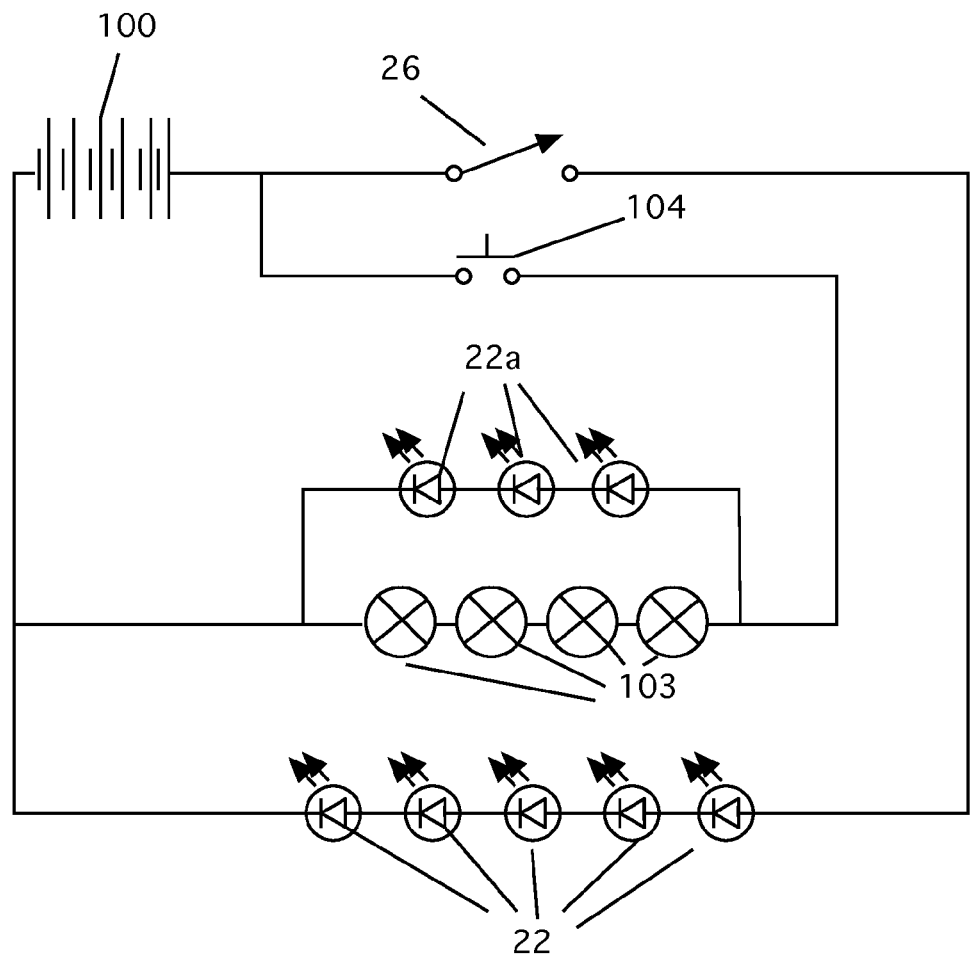
FIG. 5c is a schematic diagram showing the power circuits for the invention connected to the light and brake switches.

FIG. 5a is a schematic diagram showing the power circuits for the invention connected to a separate operating switch. This is the simplest configuration. A vehicle battery 100 is connected to a dashboard switch 25 that is then wired to the LEDs 22. FIG. 5b is a schematic diagram showing the power circuits for the invention connected to the main light switch for the vehicle. Here, the LEDs 22 are wired in parallel with the main vehicle lights 101 and are operated using the same operating switch 102 that operates the main vehicle switch. FIG. 5c is a schematic diagram showing the power circuits for the invention connected to the light and brake switches. This configuration is the most complex of the three. Here, the main set of LEDS 22 is wired to the switch 26, which may be either a separate switch or the main operating light switch as before. The difference is that a set of additional LEDS 22a is wired in parallel with the brake lights 103. Both are operated by the brake light switch 104, so that when the brakes are engaged, the LEDS 22a on the mud flaps will illuminate.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A lighted mud flap comprising:
    a) a front piece having a top, a bottom and a shape, the bottom of said front piece having a cutout formed therein;
    b) a plastic piece, having a thickness, positioned behind said front piece and being aligned with the bottom of said front piece;
    c) at least one light-emitting diode, positioned atop said plastic piece;
    d) a quantity of electrical wires, attached to said at least one light-emitting diode and extending upwards therefrom;
    e) a back piece also having a top, a bottom and a shape, wherein the shape of said back piece being the same as that of said front piece and farther wherein an upper portion of said front piece having a thickness conforming to that of the thickness of said plastic piece, and further wherein the bottom of said back piece having a cutout portion conforming to said plastic piece;
    f) a means for joining said front piece and said back piece together such that the plastic piece and the at least one light-emitting diode are held therebetween; and
    g) a means for energizing said light-emitting diode attached to said quantity of electrical wires.

2. The lighted mud flap of claim 1 wherein the shape cutout formed in said front piece is in the shape of a company logo.

3. The lighted mud flap of claim 1 wherein the shape cutout formed in said front piece is in the shape of a rectangle.

4. The lighted mud flap of claim 3 wherein a translucent logo sticker is applied in said plastic piece within said cutout in said front piece.

5. The lighted mud flap of claim 1 wherein the at least one light-emitting diode is operated from a switch.

6. The lighted mud flap of claim 1 wherein the at least one light-emitting diode is operated from a switch that also operates headlights and taillights.

7. The lighted mud flap of claim 6 wherein at least two light-emitting diodes are installed within said mud flap.

8. The lighted mud flap of claim 7 wherein one of at least two light-emitting diodes is operated from a switch that also operates headlights and taillights and the other of said at least two light-emitting diodes is operated from a switch that also operates at least one brake light.

9. The lighted mud flap of claim 1 wherein the back piece is made of rubber.

10. The lighted mud flap of claim 1 wherein the front piece is made of rubber.

11. The lighted mud flap of claim 1 wherein the front piece is made of metal.

12. The lighted mud flap of claim 9 wherein:
    a) the front piece is made of rubber; and
    b) the means for joining said front piece and said back piece together is an adhesive.

13. The lighted mud flap of claim 9 wherein:
    a) the front piece is made of metal; and
    b) the means for joining said front piece and said back piece together is rivets.

14. The lighted mud flap of claim 1 wherein: the means for energizing said light-emitting diode attached to said pair of electrical wires comprises a battery.

15. The lighted mud flap of claim 1 wherein the at least on LED is colored.

16. The lighted mud flap of claim 1 wherein the shape cutout formed in said front piece is in the form of a design.

17. The lighted mud flap of claim 1 wherein the back piece further comprises a groove, formed in said back piece to hold the quantity of electrical wires attached to said at least one LED.

18. The lighted mud flap of claim 1 wherein said quantity of electrical wires is attached to a connector.

* * * * *